United States Patent [19]
Huang et al.

[11] Patent Number: 5,932,269
[45] Date of Patent: *Aug. 3, 1999

[54] LEAVENED DOUGH COMPOSITION AND METHOD OF PREPARING

[75] Inventors: Victor Tsangmin Huang, Moundsview; Lorri Denise Cullen, Minneapolis, both of Minn.

[73] Assignee: The Pillsbury Company, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,577

[22] Filed: Dec. 9, 1996

Related U.S. Application Data

[63] Continuation of application No. 08/475,859, Jun. 7, 1995, abandoned.

[51] Int. Cl.$^6$ .............................. A21D 2/00; A21D 8/02
[52] U.S. Cl. ............................................ 426/549; 426/653
[58] Field of Search ................................. 426/549, 557, 426/653

[56] References Cited

U.S. PATENT DOCUMENTS

| | | |
|---|---|---|
| 2,810,650 | 10/1957 | Joslin . |
| 2,957,750 | 10/1960 | Knox, Jr. et al. . |
| 3,397,064 | 8/1968 | Matz . |
| 3,433,646 | 3/1969 | Savre et al. . |
| 3,554,762 | 1/1971 | Craig et al. . |
| 3,652,294 | 3/1972 | Marotta et al. . |
| 3,652,297 | 3/1972 | Peterson et al. . |
| 3,879,563 | 4/1975 | Tucker et al. . |
| 4,297,378 | 10/1981 | Haasl et al. . |
| 4,372,982 | 2/1983 | Hassl et al. . |
| 4,388,336 | 6/1983 | Yong et al. . |
| 4,415,598 | 11/1983 | Chen et al. . |
| 4,526,801 | 7/1985 | Atwell . |
| 4,548,852 | 10/1985 | Mitchell . |
| 4,678,672 | 7/1987 | Dartey et al. ............................. 426/19 |
| 4,743,452 | 5/1988 | Felske et al. . |
| 4,803,084 | 2/1989 | Shine ...................................... 426/549 |
| 4,818,553 | 4/1989 | Holscher et al. . |
| 4,840,271 | 6/1989 | Garwood . |
| 4,847,104 | 7/1989 | Benjamin et al. . |
| 4,892,762 | 1/1990 | Abdelrahman ......................... 426/549 |
| 4,904,836 | 2/1990 | Turpin et al. . |
| 4,935,251 | 6/1990 | Verhoef et al. . |
| 4,961,937 | 10/1990 | Rudel . |
| 4,966,778 | 10/1990 | Benjamin et al. . |
| 5,178,894 | 1/1993 | Rudel ..................................... 426/549 |
| 5,254,351 | 10/1993 | de Boer et al. .......................... 426/23 |
| 5,360,627 | 11/1994 | Desai et al. . |
| 5,405,636 | 4/1995 | Gard et al. . |
| 5,409,724 | 4/1995 | Heidolph et al. . |

FOREIGN PATENT DOCUMENTS

| | | |
|---|---|---|
| 0 141 754 A3 | 5/1985 | European Pat. Off. . |
| 0 203 843 A3 | 12/1986 | European Pat. Off. . |
| 0 493 850 A1 | 7/1992 | European Pat. Off. . |
| 3614465 A1 | 11/1987 | Germany . |
| 0368601 | 5/1990 | United Kingdom . |
| WO 96/09768 | 4/1996 | WIPO . |

OTHER PUBLICATIONS

Pomeranz, Y. (Ed) Wheat Chemistry and Technology, American Assoc. of Cereal Chemists, Inc., 1971, pp. 329–330, 339–340.

Fennema, O.R. (Ed), Food Chemistry, 2nd Ed., Marcel Dekker, Inc 1985, (p. 632 section B).

Pyler, *Baking Science and Technology* (3rd edition), pp. 595–597.

Food Chemistry, 2nd Edition, pp. 112–120 and 274–277.

Chemical Leavening by Monsanto, Presented to: Grand Metropolitan Technology, Barbara B. Heidolph, Jun. 30, 1992.

*Primary Examiner*—Arthur L. Corbin
*Attorney, Agent, or Firm*—Merchant, Gould, Smith, Edell, Welter & Schmidt, P.A.

[57] ABSTRACT

The invention comprises a leavened dough composition including flour, a protein source, a leavening agent, and a processing adjuvant. Preferably, the protein source is a cereal protein, such as gluten. The invention also comprises a method of increasing specific volume in a baked product by removing the water in the dough composition and introducing the processing adjuvant. The invention also comprises a baked product resulting from the method of the invention.

18 Claims, No Drawings

LEAVENED DOUGH COMPOSITION AND METHOD OF PREPARING

This is a Continuation of application Ser. No. 08/475,859, filed Jun. 7, 1995, now abandoned.

FIELD OF THE INVENTION

This invention relates to baked products made from leavened dough. In particular, the invention is directed to increasing the specific volume of such baked products. The invention teaches the addition of compounds to the dough that effect a reduction in the moisture content of the dough without attendant loss of dough consistency. By reducing the moisture content of the dough while maintaining the same dough consistency, the invention allows the specific volume of baked goods to be maximized.

BACKGROUND OF THE INVENTION

Numerous baking techniques are known which allow the creation of a great variety of baked goods, appealing to a variety of tastes. Specific volume (in cubic centimeters per gram) of baked products can be increased by using various shortenings, see Desai et al, U.S. Pat. No. 5,360,627. Shortenings are also added to leavened doughs to impart tenderness and texture to the resulting baked goods. But other factors effect specific volume. The various factors that effect the specific volume of baked goods are imperfectly understood.

An improved understanding of these factors would allow the creation of baked goods that were fluffier, and lighter in weight and texture. Desai et al., U.S. Pat. No. 5,360,627, disclose a reduced fat shortening substitute for baked products. In developing this reduced fat shortening, Desai observed that shortenings can increase the specific volume of baked goods by shortening the strands of gluten, which otherwise would form a tough, meshwork structure that did not expand during baking. Holscher et al., U.S. Pat. No. 4,818,553, likewise observed that substances can be added to leavened dough to increase the specific volume of baked products.

In developing a method for producing frozen yeast-leavened dough, Felske et al., U.S. Pat. No. 4,743,452, similarly observed that the texture and specific volume of frozen dough can be effected by addition of hydrocolloids.

None of the prior art, however, teaches how to maximize the specific volume of baked goods by reducing dough moisture content without any attendant loss of dough consistency. There is a continual need for compositions and methods that maximize the specific volume of baked goods.

SUMMARY OF THE INVENTION

In accordance with a first aspect of the invention there is provided a leavened dough composition comprising flour, a protein source, a leavener, and a processing adjuvant.

In accordance with a preferred aspect of the invention there is provided, a leavened dough composition comprising flour, the flour comprising starch and a gluten protein source. Additionally, this dough comprises a leavener and a processing adjuvant. Replacement of water in the dough with the processing adjuvant increases the onset temperature for starch gelatinization while also maintaining the dough consistency during processing.

In accordance with a further aspect of the invention, there is provided a method of increasing specific volume in a baked product comprising the steps of defining a dough composition comprising flour, a protein source, leavening agent, and water, and removing some of the water in the dough composition and introducing a processing adjuvant wherein the ratio of water concentration removed to the processing adjuvant concentration introduced ranges from about 0.25 to 1 and the resulting dough consistency is preferably within ±100 Brabender Units, or BU of the dough composition without the processing adjuvant.

We have unexpectedly found that the specific volume of a baked product can be increased by adding a processing adjuvant that decreases dough moisture content while maintaining the same mixed dough consistency. Preferably, the processing adjuvant also increases the starch gelatinization temperature and delays the onset of starch gelatinization.

Specific volume in baked products can be defined as the volume of the product divided by its weight. Specific volume is affected by numerous factors. Manipulating these factors to obtain the highest possible specific volume from a given dough system has long been an objective of food industry research. Some of these factors involve the protein content of a given system.

We have observed that beyond simply the protein content, the ratio of protein to moisture in a dough affects the specific volume of a baked product resulting from baking the dough. We have also observed that the higher the ratio, the higher the specific volume in most dough systems. Therefore, increasing the protein content and/or decreasing the water content will positively affect specific volumes.

While not intending to be bound by theory, we believe that dough water content adversely affects specific volume in two ways. The first is an increase in the degree of thermosetting of protein in the presence of conventional or excess water concentrations, and therefore an increase in the "setting" of the protein structure of the dough. The second effect is the early onset of starch gelatinization, due to the moisture content of the dough, causing the dough to "set up" too early in the baking process The water level is believed to intensify both protein thermosetting and starch gelatinization. Both of these interactions operate to increase the viscosity and ultimately set the structure of the product as it is baked. These interactions therefore minimize or adversely affect the expansion of gas bubbles or cells within the dough during baking. As the baking progresses, the product structure becomes more "set" and the gas bubbles cannot expand further.

Delaying these interactions permits optimal gas cell or bubble expansion prior to the product setting to result in a high specific volume product. The present approach is to reduce the amount of water in the dough, which increases the protein:water ratio. Reducing water content was observed to achieve a similar specific volume relationship as increasing the protein concentration, but merely reducing the water content makes the dough more difficult to process. Most of the difficulty in processing low moisture doughs is due to the changes in dough consistency, making the dough difficult to mix and further process.

The invention reduces the moisture content of doughs without loss in dough consistency. A dough of the present invention retains the rheological properties of a conventional dough, but contains less water. Not only is the water level reduced, but the water removed from the formula is replaced with compounds that maintain the dough consistency. The ultimate result is that the dough retains a processable consistency while the onset of starch gelatinization is delayed during baking, such that the dough, when baked, provides a baked product having a desirably high specific volume.

Baking, in the context of the invention means cooking by conventional or convection oven as well as microwaving.

It was surprisingly discovered that a product baked from a dough of the present invention has a specific volume significantly higher than obtained simply by altering the protein:moisture ratio. It is believed that the compounds added to minimize the effectiveness of water as a plasticizer act to permit the dough to attain a surprisingly high specific volume.

DETAILED DESCRIPTION OF THE INVENTION

The invention includes a dough, capable of producing a baked product having a high specific volume, comprising a flour, protein source, leavening agent and processing adjuvant aid. Additionally, the invention also comprises a method of increasing specific volume in baked products through introduction of a processing adjuvant into any dough composition. Generally, the dough of the invention will comprise a flour to add body, texture, consistency and mouth feel. The flour component of the dough also functions to provide the system with starch and a protein source.

The flour component of the invention may be either processed or unprocessed flour, and may be either white or whole grain flour. Grains useful for defining the dough of the invention include grain constituents such as flours, germs and bran from wheat, oats, rye, sourgum, barley, rice, millet and corn, in addition to others. The flour constituent of the invention will be present in a concentration ranging from about 30 wt-% to 70 wt-%, preferably about 40 wt-% to 65 wt-%, and most preferably about 45 wt-% to 60 wt-%.

The dough composition also comprises a gluten protein source to provide elasticity, cohesiveness, and adhesion in the dough composition. Over a range, the specific volume of baked goods can be increased by increasing the protein-:moisture ratio of the dough. For most dough systems, the higher the protein:moisture ratio, the higher the specific volume of the finished baked goods. Increasing the protein content of the dough composition thus helps to maximize the specific volume of the finished product. The protein component of the dough composition also provides elasticity to the dough which is helpful in mixing the dough.

The protein source functions to provide adhesive action promoting elasticity, cohesiveness and binding activity in the dough composition. To this end any protein source which will provide one or more of the characteristics may be used in accordance with this invention. The protein source of the invention can be derived from any cereal grain. Generally, cereal proteins such as wheat gluten, corn gluten, rye protein, triticale, barley, and mixtures have been found to provide these properties to the dough composition. Alternatively, a combination of flours with an adequate protein level can be used. The preferred protein source, however, is wheat gluten. Gluten is preferred in the dough of the invention as it provides desirable elasticity and adhesion within the dough composition. The total protein concentration in the leavened composition is generally present in a concentration ranging from about 4 to 20 wt-%, preferably from about 6 to 15 wt-%, and more preferably 8 to 12 wt-% of the composition as a whole.

The dough composition of the invention may also comprise a leavening agent. Leavening agents useful in the invention include air, steam, yeast, and baking powders such as those containing sodium bicarbonate, as well as combinations of one or more baking acids with sodium bicarbonate. Baking acids useful for leavening include monocalcium phosphate monohydrate, sodium aluminum sulfate, sodium acid pyrophosphate (SAPP), sodium aluminum phosphate (SALP), dicalcium phosphate, glucono-delta-lactone, and potassium hydrogen tartarte, and mixtures thereof. One or more of these baking acids may be combined with a bicarbonate or encapsulated bicarbonate. Preferably, a leavening system comprises sodium acid pyrophosphate, sodium aluminum phosphate, glucono-delta-lactone, and mixtures thereof with a bicarbonate such as sodium, or ammonium, or potassium bicarbonate. The dough preferably comprises from about 0.5 to 2 wt-% sodium bicarbonate, and preferably about 0.75 to 1.5 wt-%. The dough preferably comprises about 0.5 to 2 wt-%, and more preferably about 1 to 1.8 wt-%, total leavening acids.

The dough composition also comprises a processing adjuvant. Addition of the processing adjuvant increases the specific volume of the finished baked goods. The adjuvant increases the specific volume of the finished product by reducing the amount of moisture in the dough. This, in turn, delays the onset of starch gelatinization, and ultimately results in a desirably high baked product specific volume.

The processing adjuvant is added to the dough composition in place of water which would otherwise normally be present in the dough. The processing adjuvant functions to replace part of the water and part of the flour. In doing so, the processing adjuvant maintains the consistency of the dough composition. Those processing adjuvants which are useful can replace between 0.25 to 1% of dough moisture, described herein as X, per % added processing adjuvant, described herein as Y.

Generally, compositions useful as processing adjuvants in accordance with the invention include any water soluble compounds such as carbohydrates, hydrolyzed proteins, as well as mixtures thereof.

Starch hydrolysates of any molecular weight (maltodextrin, corn syrup solids, dextrins) are suitable for use as processing adjuvants, such as, polydextrose, polyfructose, sucrose, lactose, hydrogenated starch hydrolysates, and lactitol. Other useful processing adjuvants include dextrose, inulin and its hydrolyzates, and starches including corn starch and modified corn starch. Hydrolyzed proteins suitable for use in the present invention include hydrolyzed sodium caseinate, hydrolyzed gelatin, hydrolyzed milk proteins, and other hydrolyzed proteins all function as processing adjuvants. The processing adjuvants polydextrose, hydrolyzed gelatin, 20 DE corn syrup solids, 1 DE maltodextrin and sorbitol are preferred as processing adjuvants.

The processing adjuvant is added to the dough composition in a range of 2 to 20 wt-% of the dough composition. To maximize specific volume of the final product, the processing adjuvant is preferably added in the amount of 3 to 9 wt-% of the dough composition. Addition of the adjuvant in the 4–8 wt-% range of the dough composition is especially preferred.

TABLE 1

| | (wt-%) | | |
|---|---|---|---|
| | USEFUL | PREFERRED | MORE PREFERRED |
| FLOUR | 30–70 | 40–65 | 45–60 |
| TOTAL PROTEIN | 4–20 | 6–15 | 8–12 |
| LEAVENER | 1–4 | 1.25–3.3 | 1.5–2.5 |
| ADJUVANT | 2–20 | 3–15 | 4–10 |
| WATER | 20–50 | 21–48 | 22–46 |

THE METHOD OF USE

Generally, the invention is applicable any leavened dough or batter composition. Examples of compositions include breads, biscuits, rolls, pastry, etc.

Dough using the invention may comprise those constituents provided above. In formulating the composition of the invention any means known to those skilled in the art may be used. For example, in formulating the composition of the invention mixing is initiated by adding all solids except for leaveners and salt to the water and flavors used in the composition of the invention. The composition may then be mixed in any appropriate mixing vessel for about 30 seconds. The composition is then mixed until 30 seconds past peak consistency. The second stage ingredients may then be added including those solids and liquids not previously introduced.

Doughs made in accordance with the invention generally may have a water concentration less than about 50 wt-%, preferably less than about 48 wt-%, and more preferably less than about 46 wt-%. The protein:water ratio of the dough compositions of the present invention is preferably less than about 0.3. A preferred range of the protein:water ratio is between about 0.1 and 0.28, more preferably between about 0.15 and 0.26.

Another means of quantifying the preferred characteristics of the invention is to divide the wt-% of water removed from the dough over the total wt-% of processing aid in the finished dough. We have found that this factor has to be at least about 0.25, preferably about 0.45, and more preferably about 0.65. This allows for an increase in the onset of starch gelatinization, (see Table 3 at G'), of anywhere from about 2–15° C., preferably about 2–5° C., and more preferably about 5° C.

Further, the consistency of the dough composition will depend on the makeup of the dough itself as well as the amount of moisture which is removed from the dough. However, for doughs based on wheat gluten type flours, a viscosity of 700 to 1400 BU is readily obtainable at 60° F.

Ultimately, the invention provides baked products having an increase in specific volume of from about 10% to 50% when the wt-% of water removed from the system divided by the wt-% of total processing aid in the finished dough is above 0.25. Generally, specific volumes obtainable with the compositions of the invention range from about 2 to 6, preferably from about 3 to 6, and more preferably from about 4 to 6.

WORKING EXAMPLES

The following examples are intended to be illustrative but not limiting of the invention.

EXAMPLE I

The following examples were formulated to analyze the physical properties of the invention:

TABLE 2

| CONSTITUENT (wt-%) | 1A | 1B | 1C | 1D | 1E |
|---|---|---|---|---|---|
| gluten | 8.1 | 7.8 | 7.7 | 7.7 | 8.3 |
| starch | 40.6 | 39.2 | 38.5 | 38.5 | 41.3 |
| H$_2$O | 36.6 | 38.4 | 39.2 | 39.2 | 42.8 |
| processing aid | 7 (polydextrose) | 7 (gelatin) | 7 (corn syrup solids, 20 DE) | 7 (maltodextrin 1 DE) | — (control) |

| CONSTITUENT (wt-%) | 1F | 1G | 1H | 1I | 1J |
|---|---|---|---|---|---|
| gluten | 7.8 | 8.1 | 7.6 | 10.7 | 11.2 |
| starch | 38.9 | 40.6 | 37.8 | 33.5 | 36.1 |
| H$_2$O | 38.8 | 43.6 | 42.1 | 37.1 | 43.6 |
| processing aid | 7 (sorbitol) | 5 (control) | 5 (high amylose corn starch) | 10 (maltodextrin 1 DE) | — (control) |

All ingredients were weighed for 480 g batch. All solids were added except leaveners and salt to the Farinograph mixing bowl with water. Mixing was started at the #2 setting speed and after 30 seconds, the sides were scraped down. The ingredients were then mixed until 30 seconds past peak. The peak consistency in BU was recorded. The second stage ingredients were added, and mixed for 3 more minutes.

Individual samples of 200 g dough was sheeted in the following manner: $^{11}/_{32}$" for 4 passes; ¼" for four passes; 3 fold and turn. $^{11}/_{32}$" for 4 passes; ¼" for four passes. The dough was rolled tightly and pinched at the final edge in place. The dough was placed seam side down in greased aluminum loaf pan and stored at 90° F., 85% relative humidity until the dough was 2.25° high. Baking was completed in a preheated conventional oven at 375° F. for 30 minutes.

The resistance, in Brabender Units (BU), of a 480 g dough to mixing is recorded on a mechanical line and is expressed as a torque/time diagram from the start of dough mixing in a Farinograph bowl. The mixing bow temperature is kept at 60° F. and the shearing speed is 63 rpm. One Kg weights are added to the mechanical arm to facilitate consistency readings above 1000 BU. The midpoint of the peak torque is recorded as the consistency of the dough in BU. For doughs with BU higher than 1350 or lower than 1150 BU's, flour and water levels were adjusted to reach the final BU of 1250+/−100 BU.

Differential Scanning Calorimeter (DSC) is used for measuring the onset temperature of starch gelatinization in dough. About 55–75 mg of dough is placed in a DSC pan, the dough is heated from 20° C. to 150° C. at the rate of 10° C./min. At the end of the run, a heat flow-temperature curve is generated. The commonly used technique for determining onset temperatures is to take the intersections between straight lines drawn through the baseline and the left tangent line of the first major melting peak.

Specific volume (SV) in the unit of cc/g is defined as the volume (cc) of a given baked product per unit weight (g). The baked product was cooled out of the pan for 30 minutes and was weighed after cooling for 1 hour. The specific volume was measured using the rapeseed displacement method. A measured volume of rapeseeds in a container is poured over and around the baked product placed in the same container. The volume increase of rapeseeds displaced by the baked product is determined, and divided by the weight of the baked product to give the specific volume of the product.

The dough evaluated in this example contains flour, water, 1% salt, 3% shortening, and a sodium bicarbonat, SAPP, SALP leavening system. Gluten was added when higher levels of protein have been studied. This model system showed that the ratio of protein to moisture has strong influence on specific volume. The higher the ratio of gluten to moisture, the higher the specific volume, see Table 3 below. Table 3 shows that when the ratio of water removed to processing adjuvant added, X/Y, is around 0.2, no significant increase in specific volume is observed. When X/Y is greater than or equal to about 0.5, the specific volume increases significantly, as does the onset TG' and the maximum TG' and the gelatinization temperature. A concomitant decrease in maximum G' is also observed.

This table reports the physical properties obtained from the various compositions of EXAMPLE I:

TABLE 3

| EXAMPLE | x/y* | specific volume (g/cc) | gel (°C.) temperature | G' max** (kdyne/cm$^2$) | TG' max*** (°C.) | TG' onset**** (°C.) |
|---|---|---|---|---|---|---|
| 1A | 0.89 | 4.2 | 75.2 | — | — | — |
| 1B | 0.63 | 4.2 | 71.6 | 827 | 95 | 65.5 |
| 1C | 0.51 | 4.1 | 68.7 | — | — | — |
| 1D | 0.51 | 3.9 | 68.6 | 1061 | 83.8 | 61.1 |
| 1E | — | 3.7 | 65.5 | 1354 | 80.8 | 53.0 |
| 1F | 0.57 | 3.7 | 69.5 | 1229 | 86.6 | 61.1 |
| 1G | — | 3.5 | 65.7 | — | — | — |
| 1H | 0.20 | 3.3 | 64.3 | 1805 | 80.8 | 55.1 |
| 1I | 0.93 | 4.6 | 71.4 | — | — | — |
| 1J | — | 4.4 | 64.9 | 825 | 82.8 | 57.1 |

*x is the concentration of water removed from the formula in favor of processing adjuvant added. y is the concentration of processing adjuvant.
**G' max is the maximum elastic modulus of the dough during heating.
***TG' max is the temperature at which G' is maximum.
****TG' onset is the temperature at which G' begins to increase.

EXAMPLE II

This example demonstrates a very high gluten product (13.2–13.8%). Breads were made from doughs with the following formulas:

| | IIA (wt-%) | IIB (wt-%) | IIC (wt-%) |
|---|---|---|---|
| wheat flour | 37 | 37 | 40 |
| wheat gluten | 11 | 11 | 11 |
| wheat starch | 10 | 7 | 3 |
| 1 DE maltodextrin | 0 | 3 | 7 |
| water | 39.51 | 39.51 | 36.51 |
| Sodium Acid Pyrophosphate (SAPP) | 1.07 | 1.07 | 1.07 |
| Sodium Aluminum Phosphate (SALP) | 0.32 | 0.32 | 0.32 |
| Sodium Bicarbonate (SODA) | 1.1 | 1.1 | 1.1 |
| Total | 100.00 | 100.00 | 100.00 |
| gluten(%) | 13.2 | 13.2 | 13.5 |
| wheat starch(%) | 36.6 | 33.9 | 32.4 |
| H2O(%) | 46.2 | 45.9 | 42.9 |
| starch/gluten | 2.8 | 2.6 | 2.4 |
| -%H2O/%added (X/Y) | — | 0.10 | 0.47 |
| mix time(min) | 7 | 10.5 | 9.5 |
| consistency (BU) | 1200 | 1020 | 1360 |
| Proof time(Min) | 2.5 hr | 2.5 hr | 2.25 hr |
| weight loss(%) | 10 | 10 | 10.4 |
| SV(cc/g) | 3.1 | 3 | 3.4 |

The same mixing and measuring procedures were used as in Example I. The results indicate that that X/Y less than 0.25, the specific volume was not significantly affected.

EXAMPLE III

The following compositions were formulated in accordance with the method of the invention as can be seen in Table 4. This example demonstrates low protein (6.3–6.7%) compositions.

TABLE 4

| | CONTROL | 3A | 3B |
|---|---|---|---|
| 1 DE Maltodextrin | — | 6% | 10% |
| Flour | 61 | 59.51 | 57.01 |
| Gluten | 0 | 0 | 0 |
| Salt | 1 | 1 | 1 |
| Shortening | 3 | 3 | 3 |
| Water | 32.51 | 28 | 26.5 |
| SAPP | 1.07 | 1.07 | 1.07 |
| SALP | 0.32 | 0.32 | 0.32 |
| SODA | 1.1 | 1.1 | 1.1 |
| TOTAL | 100.00 | 100.00 | 100.00 |
| Gluten (%) | 6.7 | 6.5 | 6.3 |

TABLE 4-continued

|  | CONTROL | 3A | 3B |
|---|---|---|---|
| Wheat Starch (%) | 42.7 | 41.7 | 39.9 |
| H2O (%) | 41.1 | 36.3 | 34.5 |
| Starch/gluten | 6.4 | 6.4 | 6.4 |
| "Flour"/water | 1.88 | 2.13 | 2.15 |
| Consistency (BU) | 1250 | 1340 | 1320 |
| Mix time (min) | 4.5 | 5.5 | 10.5 |
| Proof height (in) | 2.25 | 2.25 | 2.25 |
| Weight loss (%) | 12 | 12 | 12.5 |
| Specific Volume cc/g | 3.6 | 3.9 | 4.3 |
| X/Y | Control | 0.8 | 0.66 |

Example III shows that the displacement of water in favor of processing adjuvant increases specific volume.

The above discussion, examples, and embodiments illustrate our current understanding of the invention. However, since many variations of the invention can be made without departing from the spirit and scope of the invention, the invention resides wholly in the claims hereinafter appended.

We claim as the invention:

1. A leavened dough composition consisting essentially of:
   (a) from about 30 to 70 wt-% flour, said flour comprising ungelled starch;
   (b) an amount of protein source being effective to provide a specific volume of about 4–6 cc/gm in a baked product resulting from the dough composition, said protein source present in an amount ranging from about 4 to 20 wt-%;
   (c) from about 1 to 4 wt-% of leavening agent effective to leaven the dough during baking;
   (d) water, at a concentration of less than about 50 wt-%; and
   (e) from about 2 to 20 wt-% of a processing adjuvant, said processing adjuvant being present in a concentration effective to increase the gelatinization temperature of said ungelled starch from about 2° C. to 15° C. and maintain the consistency of the composition prior to baking; and wherein the protein:water ratio ranges from about 0.1 to 0.28 and said dough is refrigerated prior to use.

2. The composition of claim 1 wherein said adjuvant is selected from the group consisting of a protein, a carbohydrate and mixtures thereof.

3. The composition of claim 1 wherein said processing adjuvant is selected from the group consisting of hydrolyzed gelatin, polydextrose, corn syrup solids, maltodextrin, sorbitol, dextrose, modified starch, inulin and its hydrolysates, dextrins and mixtures thereof.

4. The composition of claim 1 wherein said protein source comprises a cereal protein.

5. The composition of claim 4 wherein said cereal protein comprises gluten present in a concentration of about 4 to 20 wt-% of the composition taken as a whole.

6. A leavened dough composition useful for making a baked product, said dough composition consisting essentially of:
   (a) from about 40 wt-% to about 65 wt-% flour, said flour comprising ungelled starch;
   (b) a protein source present in an amount of about 6 to 15 wt-% based on the total composition;
   (c) from about 1 to 4 wt-% of a leavening agent;
   (d) water, in a concentration of about 20 to 50 wt-%; and
   (e) from about 2 to 20 wt-% of a processing adjuvant present in a concentration, effective to increase the gelatinization temperature of said starch from about 2° C. to 15° C.; and wherein the protein:water ratio ranges from about 0.15 to 0.26, the specific volume of the baked product ranges from about 4 to 6 cc/g and said dough is refrigerated prior to use.

7. The composition of claim 6 wherein said processing adjuvant is selected from the group consisting of a protein, a sugar, a starch and mixtures thereof.

8. The composition of claim 6 wherein the processing adjuvant is present in a concentration of from about 3 to 15 wt-%.

9. The composition of claim 6 wherein said processing adjuvant is selected from the group consisting of hydrolyzed gelatin, polydextrose, corn syrup solids, maltodextrin, sorbitol, modified corn starch, and mixtures thereof.

10. The composition of claim 6 wherein said protein source comprises a cereal protein.

11. The composition of claim 10 wherein said cereal protein comprises gluten present in a concentration of about 4 to 20 wt-% of the composition taken as a whole.

12. A method of increasing specific volume in a baked product by delaying the onset of starch gelatinization, said method comprising the steps of:
   (a) preparing a dough composition consisting essentially of from about 30 to 70 wt-% flour, said flour comprising ungelled starch; from about 4 to 20 wt-% of a protein source; about 1 to 4 wt-% of a leavening agent; and less than about 48 wt-% water; and
   (b) increasing the gelatinization temperature of said starch from about 2° C. to 15° C. by introducing a processing adjuvant as a water replacement in said dough composition; and where in the ratio of replaced water to processing adjuvant ranges from about 0.25 to about 1, the protein:water ratio in said dough composition ranges from about 0.1 to about 0.28, and upon baking the dough composition, the resulting baked product has a specific volume of about 4 to 6 cc/g.

13. The method of claim 12 wherein said processing adjuvant is selected from the group consisting of a protein, a carbohydrate, and mixtures thereof.

14. The method of claim 12 wherein the processing adjuvant is present in a concentration of from about 2 to 20 wt-%.

15. The method of claim 12 wherein said processing adjuvant is selected from the group consisting of gelatin, polydextrose, corn syrup solids, maltodextrin, sorbitol, corn starch, and mixtures thereof.

16. The method of claim 12 wherein said protein source comprises a cereal protein.

17. The method of claim 16 wherein said cereal protein comprises gluten present in a concentration of about 4 to 20 wt-% of the composition taken as a whole.

18. The method of claim 12 wherein said flour comprises gluten in a concentration ranging from about 4 to 20 wt-% based on the composition as a whole.

* * * * *